United States Patent [19]

Markham

[11] Patent Number: 5,324,423
[45] Date of Patent: Jun. 28, 1994

[54] UV BULB INTENSITY CONTROL FOR WATER TREATMENT SYSTEM

[75] Inventor: Ronald C. Markham, Kentwood, Mich.

[73] Assignee: Amway Corporation, Ada, Mich.

[21] Appl. No.: 16,594

[22] Filed: Feb. 11, 1993

[51] Int. Cl.$^5$ ............................ B01D 17/12; H05B 41/38
[52] U.S. Cl. .................................. 210/87; 210/97; 210/192; 315/310; 315/DIG. 4; 422/105; 422/186.3
[58] Field of Search ............... 210/739, 748, 87, 97, 210/143, 192, 243; 422/24, 105, 186.3; 250/432 R, 435, 436; 315/307, 310, 311, DIG. 4

[56] References Cited

U.S. PATENT DOCUMENTS

| | | | |
|---|---|---|---|
| 2,590,152 | 3/1952 | Buckey | 15/319 |
| 3,176,447 | 4/1965 | Omohundro et al. | 55/279 |
| 3,335,272 | 8/1967 | Dickinson et al. | 422/24 |
| 3,906,187 | 9/1975 | Turoczi, Jr. | 219/254 |
| 3,944,876 | 3/1976 | Helmuth | 315/205 |
| 4,204,956 | 5/1980 | Flatow | 210/87 |
| 4,381,476 | 4/1983 | Adachi et al. | 315/101 |
| 4,400,270 | 8/1983 | Hillman | 210/103 |
| 4,488,087 | 12/1984 | Adachi et al. | 315/101 |
| 4,504,445 | 3/1985 | Walz | 422/186.3 |
| 4,661,264 | 4/1987 | Goudy | 210/748 |
| 4,752,401 | 6/1988 | Bodenstein | 210/746 |
| 4,816,145 | 3/1989 | Goudy | 210/243 |
| 4,847,536 | 7/1989 | Lowe et al. | 315/127 |
| 5,006,244 | 4/1991 | Maarschalkerweerd | 210/192 |
| 5,230,792 | 7/1993 | Sauska et al. | 210/143 |

FOREIGN PATENT DOCUMENTS 3739966 6/1989 Fed. Rep. of Germany ...... 210/748

Primary Examiner—Joseph W. Drodge
Attorney, Agent, or Firm—Warner, Norcross & Judd

[57] ABSTRACT

A control circuit for reducing current flow through the UV light bulb of a water purification unit when water is not flowing through the unit. In a first embodiment, the control circuit includes an RC shunt selectively connected in parallel with the UV bulb, thereby selectively adding a positive impedance in parallel with the negative impedance of the bulb. In a second embodiment, the control circuit includes an impedance selectively connected in series with the bulb ballast. In either embodiment, the impedance circuit is actuated in response to a water flow switch. When water is flowing through the unit, the impedance is removed so that full current is delivered to the bulb enhancing UV intensity. When water is not flowing through the unit, the impedance is added so that current flow is reduced.

11 Claims, 1 Drawing Sheet

5,324,423

UV BULB INTENSITY CONTROL FOR WATER TREATMENT SYSTEM

BACKGROUND OF THE INVENTION

The present invention relates to water treatment systems, and more particularly to a bulb intensity control circuit for an ultraviolet household water treatment system.

Household water treatment systems are gaining popularity, particularly in areas with less than ideal potable water. A household unit is mounted on a single tap to treat selectively water flowing through the tap. Treatment may include filtration, sterilization, or both.

The most effective water treatment systems include ultraviolet (UV) irradiation for sterilizing the water stream. It is well known that such UV treatment kills bacteria and viruses with an extremely high degree of reliability. The water to be treated is routed through a container, and a UV light source within or adjacent to the container directs UV light through the water stream.

Two considerations factor into the intensity of the UV light. First, it is desirable to operate the light at optimum intensity to achieve the maximum "kill rate" whether water is flowing or stagnated. Second, it is desirable to avoid excessive UV light intensity to avoid excessive warming of water "stagnated" within the treatment chamber when water flow stops. Stagnation occurs whenever the tap is not used for a considerable period of time, for example, overnight. Prior artisans have accommodated these considerations by selecting a single optimum intensity of a constantly on bulb to balance "kill rate" and temperature rise. The UV bulb is always at optimum intensity, and the first water out of the tap is properly treated. When water flow ceases, the optimum UV intensity prevents bacteria from recolonizing in the treatment chamber. However, the temperature rise of the stagnated water is undesirable.

SUMMARY OF THE INVENTION

The aforementioned problems are overcome in the present invention wherein the intensity of a UV light bulb is controlled by selectively introducing an impedance, in addition to the ballast, into the bulb circuit to selectively control the bulb intensity. When water flow is detected, the additional impedance is "removed" from the circuit so that the bulb operates at optimum intensity to optimize the kill rate. When water flow stops, the additional impedance is "added" to the circuit so that the bulb operates at a reduced intensity to avoid undesirable temperature rise in the stagnated water.

In a first embodiment, the additional impedance is an RC circuit in parallel across the bulb filaments. The RC circuit can be switched into and out of the circuit using a switch in series with the RC circuit. When actuated, the resistor dissipates current to reduce bulb intensity. Current continues to flow through the bulb filaments, keeping them closer to operating temperature and thus prolonging their life. The capacitance offsets the current phase shift created by the ballast to maximize the power factor of the system. Voltage and current peak more closely together to deliver more power to the bulb than in the first embodiment.

In a second embodiment of the invention, the additional impedance is an inductance in series with the lamp ballast. The inductance is selectively introduced using a switch. When the switch is in one position, the inductance is added to the circuit; and when the switch is in the other position, the inductance is removed from the circuit. This embodiment is simple and inexpensive.

In either embodiment, actuation of the switch is responsive to a flow switch in the water treatment system. When water flow is detected, the additional impedance is configured to operate the bulb at full intensity. When water flow terminates, the switch is actuated after a delay period to reduce bulb intensity.

The invention provides an extremely effective, simple, and cost-efficient circuit for regulating the bulb intensity of a UV water treatment system.

These and other objects, advantages, and features of the invention will be more fully understood and readily appreciated by reference to the detailed description of the preferred embodiment and the drawings.

DETAILED DESCRIPTION OF THE PREFERRED EMBODIMENTS

Figure 4:
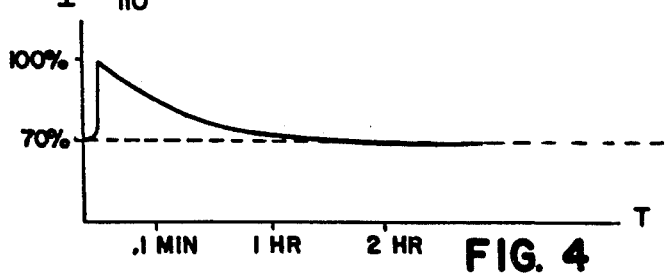
FIG. 4 is a graph illustrating bulb intensity versus time in air after the circuit switches from reduced intensity to full intensity.

This invention exploits a little known and little studied phenomenon called "initial intensity decay to nominal." This phenomenon occurs when the plasma arc across the bulb filaments first starts or first goes to a more highly excited state. Immediately after the transition, the temperature still corresponds to the lower state equilibrium due to thermal lag. Once the temperature rises to the running or higher state equilibrium, physical laws start to take over, causing self absorption, increased gas pressure, and level saturation. This causes a slow decay to approximately 70% intensity as compared to the moment of start-up or transition as illustrated in FIG. 4.

By sensing water flow, this invention synchronizes the change of the plasma arc from a low energy state to a high energy state with the flow of water. When water starts to flow, the UV bulb is switched to a high state causing it to emit its highest intensity for that state. Because the water acts as a heat sink or coolant, it delays the thermal effects and acts to sustain the higher intensity and higher kill. Eventually, the temperature will increase or the water flow will stop. In the case of consumer use, the flow will stop before the temperature increase. The resulting benefits include reduced exposure time and the ability to use lower wattage bulbs for the same kill rate.

I. RC Shunt Embodiment

Figure 2:
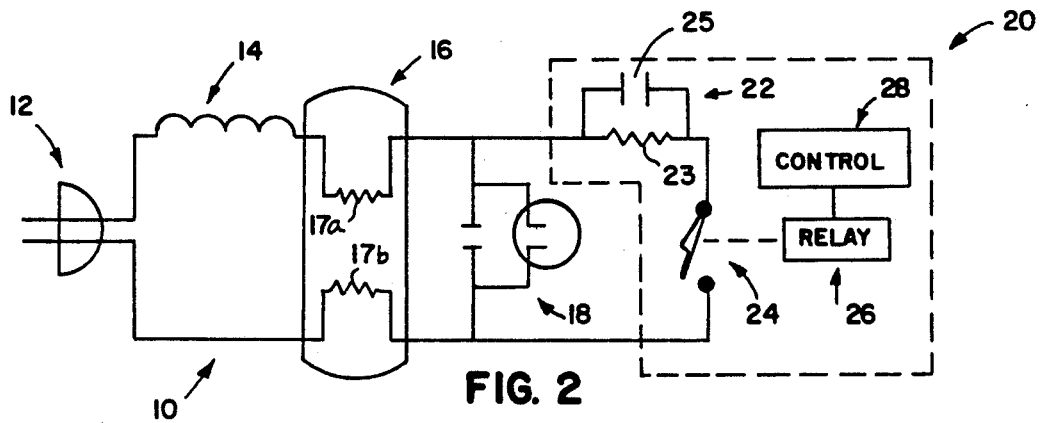
FIG. 2 is a schematic circuit diagram of the RC shunt intensity control circuit embodiment.

The ultraviolet (UV) power system of the first embodiment of the present invention is illustrated in FIG. 2 and generally designated 10. The system includes the conventional components of a power connection 12, an inductive ballast 14, a UV bulb 16, and a starter circuit 18. The system 10 further includes an intensity control circuit 20 having an RC circuit 22 connected in parallel with the bulb 16, an actuation switch 24, and a relay 26 controlled by the control 28. Briefly summarizing, the control 28 operates the relay 26 to open and close switch 24. When switch 24 is open (e.g. when water is flowing), the power circuit 10 operates in conventional fashion to provide full power to the UV bulb 16. When the switch 24 is closed (e.g. a predetermined period after water flow stops), current is shunted through the RC circuit 22 to reduce bulb intensity.

Figure 1:
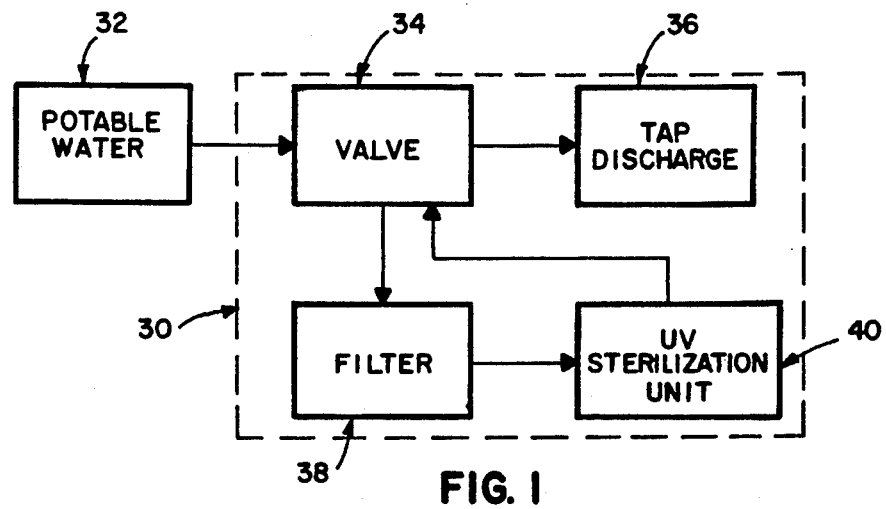
FIG. 1 is a block diagram of a water treatment system in which the UV power circuit of the present invention may be used.

Turning to FIG. 1, the power control system of FIG. 10 would be included in a water treatment system of the type illustrated in FIG. 1 and generally designated 30. The line connections illustrated between the blocks of FIG. 1 are fluid connections permitting water flow through the treatment system. Generally speaking, the water treatment system is connected to a potable water supply 32 and includes a valve 34 for selectively routing water either directly to the tap discharge 36 or to the filter and sterilization units 38 and 40. The valve may be of the type illustrated in copending application Ser. No. 07/977,161, filed Nov. 16, 1992, and entitled FAUCET DIVERTER VALVE.

In the water treatment system 30, the water can be sent directly to the tap discharge 36 by putting valve 34 in a first manually selected position. Alternatively, the valve 34 can be placed in a second manually selected position where the water is routed sequentially through the filter 38 and the sterilization unit 40 before being discharged from the tap at 36. The tap can include two discharges—one for treated water and a second for untreated water. The filter 38 is preferably a carbon-activated filter. The UV sterilization unit includes a water chamber, container, or passageway in conjunction with an ultraviolet (UV) source of light for sterilizing water flowing therethrough.

Figure 3:
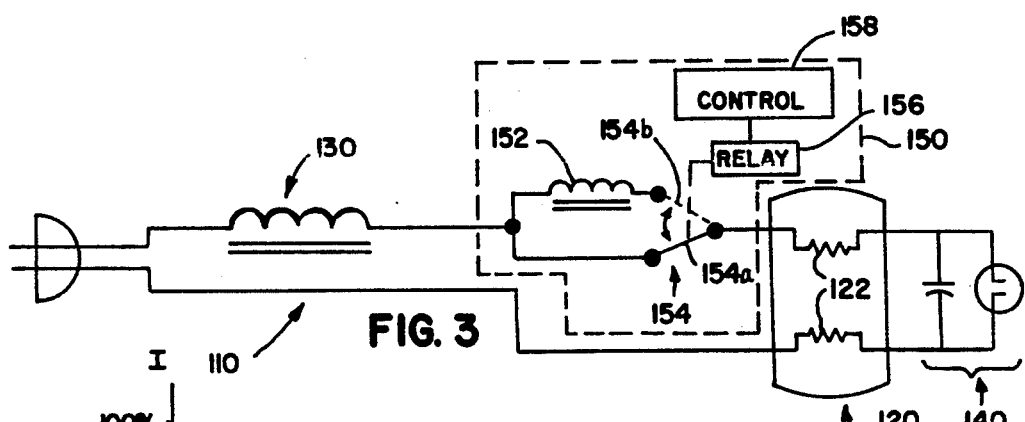
FIG. 3 is a schematic circuit diagram of the series impedance intensity control circuit embodiment.

Returning to the power circuit 10 of FIG. 3, the plug 12 or other power connection is conventional and is selected to be compatible with the power distribution system to which the circuit is to be connected. Although the power connection is illustrated as a conventional plug, the system also may be hard-wired to the power source.

The ballast 14 also is conventional. The impedance of the ballast is selected to reduce the current through the UV bulb to an ideal value for which the bulb is designed at the connected power voltage.

The UV bulb 16 is a conventional gas-discharge bulb including a pair of filaments 17a and 17b. The filaments are connected in series with the ballast 14. As is well known, current flowing through the filaments heats the filaments and supplies a source of electrons to establish the initial arc through the gas within the bulb. Once started, the voltage across the bulb is determined by the chemistry and construction of the bulb 16. As the impedance of the ballast decreases, the current through the bulb increases. This increase in current excites more atoms in the gas which decreases the impedance of the bulb, thus maintaining the voltage across the bulb essentially constant.

The starter circuit 18 is also of conventional construction and is connected in series between the filaments 17a and 17b.

The control circuit 20 operates under the control of control 28 to selectively permit the bulb to operate at full intensity or reduced intensity. An RC circuit 22, including a resistor 23 and a capacitor 25 in parallel, is electrically connected in parallel with the bulb 16 and bulb filaments 17. The switch 24 is electrically connected in series with the RC circuit 22 to selective include or exclude the RC circuit from the power circuit 10. The switch 24 is actuated by a relay 26 under the control of the control 28. The control 28 is responsive to a conventional flow switch (not shown) in the water treatment system 30, which provides an indication of whether water is flowing through the system.

Operation

The power circuit 10 operates in one of two modes depending upon whether the switch 24 is open or closed. When water flow is detected by the control 28, relay 26 is actuated to open the switch 24. With the switch so open, the RC circuit 22 is electrically removed from the power circuit 10. Hence, the power circuit operates in conventional fashion with current flow through the inductor 14, the filaments 17a and 17b, and the starter circuit 18. When operating in this mode, the ideal voltage and current are created within the filaments 17 to operate the lamp at what is described as "full intensity."

The control 28 determines when the bulb intensity is to be reduced. As presently designed, bulb intensity is reduced 15 minutes after water flow has terminated. This delay is designed to provide a desirable balance between 1) full kill of the water bacteria and viruses trapped in the UV sterilization unit, 2) avoiding unnecessary heating of this "stagnant" water, and 3) maintain current through the filaments to increase the coating life. Other criteria could be used for determining when the bulb intensity is to be reduced.

When bulb intensity is to be reduced, the control 28 causes the relay 26 to close the switch 24. The closing of the switch causes the RC circuit 22 to be electrically connected to the power circuit 10. A portion of the circuit current is then shunted and dissipated in the RC circuit 22 to reduce the bulb current while continuing filament current. The value of the resistor 23 preferably is selected so that the filament current is one-half of the "full intensity" current. The value of the capacitor 25 is selected to correct the phase-shift error caused by the ballast 14. The RC circuit 22 therefore is a positive impedance added in parallel with the negative impedance of the bulb.

By both reducing current and correcting the phase-shift error causes by the ballast 14, the temperature of the bulb is reduced. Further, current and voltage across the bulb peak simultaneously, thereby providing maximum power to the bulb for a given current. This improved power factor results in both savings to the consumer and more effective current to the bulb.

The intensity profile of the UV bulb in air versus the time domain is illustrated in FIG. 4. Initially, at $T=0$, the bulb is powered to "full intensity" mode. Maximum intensity is in the first five to ten minutes. The subsequent drop in intensity is due to heat. By reducing current through the bulb and thus reducing bulb intensity when in the "half intensity" mode, the peak intensity is achieved when the bulb is first put into high mode. This technique delivers more UV light to the water within the sterilization unit while reducing water temperature during "stagnation," resulting in a higher bacteria/virus kill without employing a higher wattage bulb.

As will be appreciated, the present invention provides an effective, simple, inexpensive circuit for reducing bulb intensity without sacrificing bulb life.

II. Series Impedance Embodiment

The UV power system of the second embodiment of the invention is illustrated in FIG. 3 and generally designated 110. The system includes a UV bulb 120 having a pair of filaments or elements 122, a ballast 130, and a starter circuit 140. The system 150 further includes an inductor 152, a switch 154, a relay 156, and a control 158 responsive to a flow switch (not specifically shown). When water is flowing through the treatment system as determined by the control 158, relay 156 is actuated to put the switch 154 in position 154a. In this condition, current bypasses the inductor 152; and the circuit 110 behaves in conventional fashion to drive the UV light source 120 at optimum intensity. When water stops flowing as determined by control 158, relay 156 is actuated to toggle the switch 154 to the position 154b that current flows through the inductor 152. By increasing the total circuit impedance, the filament current is decreased, which also decreases the filament temperature and reduces bulb intensity; and the bulb goes to a low state. Unfortunately in this design, the voltage is greatly out of phase with the current. This produces reduced power to the bulb. Further, the reduced filament temperature reduces bulb life because atoms deplated from the filaments combine with the mercury within the bulb and thereby increases bulb impedance. In the preferred embodiment, the reduced current is one-half (0.5) of the full current. This ratio has been selected after significant experimentation to maintain filament life longer than quartz life.

The above descriptions are those of preferred embodiments of the invention. Various alterations and changes can be made without departing from the spirit and broader aspects of the invention as set forth in the appended claims, which are to be interpreted in accordance with the principles of patent law including the doctrine of equivalents.

The embodiments of the invention in which an exclusive property or privilege is claimed are defined as follows:

1. An improved water purification unit including a water conduit, an ultraviolet (UV) light bulb for directing UV light through water within said conduit, and a power circuit for supplying AC electrical current to said bulb, the improvement comprising said power circuit comprising:
   water flow switch means for indicating water flow within said conduit; and
   control means responsive to said flow switch for supplying a first current to said bulb when water flow is detected and a second reduced current to said bulb when water flow is not detected, said control means including impedance means for selectively adding impedance to said power circuit, said impedance means including a positive impedance and switch means for selectively coupling said positive impedance in parallel with said bulb.

2. An improved water purification unit as defined in claim 1 wherein said positive impedance is capacitive.

3. An improved water purification unit as defined in claim 2 wherein said positive impedance comprises an RC circuit.

4. A water purification unit comprising:
   water containing means for containing water;
   flow switch means for indicating when water is flowing through said water containing means;
   a UV gas-discharge light source arranged to direct UV light through water within said water containing means, said light source having a pair of filaments;
   a positive impedance shunt circuit connected in parallel with said filaments of said UV light source;
   an actuation switch electrically connected in series with said shunt circuit; and
   control means responsive to said flow switch for controlling said actuation switch so as to open and close said actuation switch and selectively actuate said shunt circuit.

5. A water purification unit as defined in claim 4 wherein said shunt circuit is capacitive.

6. A water purification unit as defined in claim 5 wherein said shunt circuit includes an RC circuit.

7. A water purification unit as defined in claim 4 further comprising an inductive ballast electrically connected in series with said UV light source.

8. An electrical circuit operable for use with a water purification unit of the type wherein water is exposed to UV light, said circuit comprising:
   connector means for connecting said circuit to an AC power source;
   a UV gas-discharge light bulb;
   an inductive ballast electrically connected between said connector means and said bulb;
   flow switch means for indicating when water is flowing through said purification unit; and
   control means electrically connected to said connector means and said bulb and responsive to said flow switch means for selectively delivering either a first current or a second current to said bulb, the second current being less than the first current, said control means including impedance means for providing an electrical impedance and actuation switch means for actuating said impedance means within said electrical circuit, said impedance means comprising a shunt circuit connected in parallel with said bulb, said shunt circuit providing a positive impedance.

9. An electrical circuit as defined in claim 8 wherein said shunt circuit is capacitive.

10. An electrical circuit as defined in claim 9 wherein said shunt circuit comprises an RC circuit.

11. An electrical circuit as defined in claim 8 wherein said impedance means is coupled in series with said ballast.

* * * * *